United States Patent
Stahl (10) Patent No.: US 11,760,272 B2
(45) Date of Patent: Sep. 19, 2023

(54) SLEEPING COT FOR A VEHICLE

(71) Applicant: Gregory Stahl, Carpinteria, CA (US)

(72) Inventor: Gregory Stahl, Carpinteria, CA (US)

( * ) Notice: Subject to any disclaimer, the term of this patent is extended or adjusted under 35 U.S.C. 154(b) by 272 days.

(21) Appl. No.: 17/174,354

(22) Filed: Feb. 12, 2021

(65) Prior Publication Data
US 2021/0162929 A1 Jun. 3, 2021

(51) Int. Cl.
*B60R 11/00* (2006.01)
*A47G 9/00* (2006.01)

(52) U.S. Cl.
CPC ............. *B60R 11/00* (2013.01); *A47G 9/00* (2013.01); *B60R 2011/0015* (2013.01); *B60R 2011/0052* (2013.01); *B60R 2011/0066* (2013.01); *B60R 2011/0078* (2013.01); *B60R 2011/0082* (2013.01)

(58) Field of Classification Search
CPC ... A47G 9/00; B60R 11/00; B60R 2011/0015; B60R 2011/0052; B60R 2011/0066; B60R 2011/0078; B60R 2011/0082; A47C 17/64; A47C 17/645; A47C 17/68; A47C 17/74; A47C 17/80
USPC ...................................... 5/110, 111, 118, 119
See application file for complete search history.

(56) References Cited

U.S. PATENT DOCUMENTS

| | | | | |
|---|---|---|---|---|
| 1,236,351 | A * | 8/1917 | Proctor | A47C 17/80 5/8 |
| 1,555,038 | A * | 9/1925 | Thweatt | A47B 31/06 5/118 |
| 1,943,648 | A * | 1/1934 | Wessman | B60P 3/38 5/118 |
| 4,679,840 | A * | 7/1987 | Fry | A47C 17/80 5/120 |
| 5,170,521 | A * | 12/1992 | Light | A47C 17/84 5/118 |
| 6,230,340 | B1 * | 5/2001 | Edwards | B60P 3/38 5/118 |
| 8,117,691 | B2 * | 2/2012 | Bishop | A45F 3/22 5/118 |
| 8,424,132 | B2 * | 4/2013 | Stimel | B60N 2/34 5/118 |
| 2005/0022304 | A1 * | 2/2005 | Schwingeler | A61G 1/00 5/118 |
| 2022/0250522 | A1 * | 8/2022 | Haycock | B60N 2/345 |

* cited by examiner

Primary Examiner — William V Gilbert (57) ABSTRACT

A sleeping cot has been disclosed herein. The sleeping cot may be partially installed in a front cabin of vehicles and deployed when needed. The sleeping cot includes metallic rods and a flexible mat that is removably attached to the metallic rods. The sleeping cot unit may further include front brackets attached to or adjacent the A-pillars of the vehicle and rear brackets attached to or adjacent the B-pillars of the vehicle. Further, one metallic rod is removably attached to the front brackets, and another metallic rod is removably attached to the rear brackets. Further, the flexible mat can be made firm by rotating one of the metallic rods within the brackets tightening the fabric mat wrapped around it. Further, the rotation and position of the metallic rod can be temporarily secured within the brackets to retain a firm mat.

18 Claims, 12 Drawing Sheets

SLEEPING COT FOR A VEHICLE

TECHNICAL FIELD OF INVENTION

The present invention relates generally to aftermarket automobile accessories and particularly to a sleeping cot unit for a vehicle. More specifically, the present invention relates to a sleeping cot unit, for children or small adults, that is suspended by vertical members of the vehicle in the front cabin of vans or trucks.

BACKGROUND

With the development of larger consumer vehicles and technology, people are now able to travel with more of the comforts and conveniences of home. Because of these advancements, there is growing popularity in recreational travel using these vehicles such as vans and trucks. The ability to travel with sleeping and living spaces inside these vehicles is essential to the purpose of these van or truck "campers". Typically, these vehicles are set up with a sleeping platform in the rear cargo area that is often only able to accommodate one to two people comfortably. With groups or families traveling together in these vehicles and having sufficient sleeping arrangements for all persons often requires packing and setting up additional shelter or making arrangements for a motel or hotel.

Often, the front cabin of the vehicle is considered unusable as a sleeping location due to the awkward configuration of available space that the vehicle's seats create. Few efforts have been made to establish arrangements for sleeping or resting in this space. For example, U.S. Patent Publication No. 20190315253 describes a foldable bed that is supported by extendable legs, allowing the bed to straddle a front seat of a vehicle when in a required fully reclined position. The foldable bed may include a foldable frame, a platform and a plurality of legs configured to each other. The foldable frame may include a plurality of frame parts, and a plurality of latching mechanism may be coupled to the plurality of frame parts. However, this foldable bed may be slippery at times since the legs are not fixed to any portion of the vehicle. This may cause injury to people who are sleeping over it.

Another example, EP2752135B1 to R. Olphin describes a temporary sleeping arrangement for a vehicle wherein one side of a fabric support structure (sleeping platform) is placed over and supported by the back portion of two front seats in a vehicle, while the other side is supported by brackets mountable to the vehicle's interior. While this concept is limited by front seat capabilities, it also results in a narrow and limp, hammock style sleeping area that can be uncomfortable and restrictive.

The inventor, with an objective to address these issues, proposes a sleeping cot unit that can be setup above the seats, in the front cabin of vehicles, that provides a firm platform useful for sleeping or resting.

SUMMARY

It is an objective of the present invention to provide a sleeping cot unit that can be partially installed in vehicles (such as vans and trucks) and deployed when needed. The sleeping cot unit may be suspended by vertical members of a vehicle in its front cabin.

Another objective of the present invention is to provide the sleeping cot unit that is collapsible and occupies less space for storage when stowed in the vehicle.

Another objective of the present invention is to provide the sleeping cot unit having a sleeping area sized to accommodate small adults and children.

Yet another objective of the present invention is to provide the sleeping cot unit installable in vehicles to create a comfortable and safe area for the user while they are sleeping.

Another objective of the present invention is to provide the sleeping cot unit that can be installed over the seats in the front cabin of the vehicle.

The sleeping cot unit may include a plurality of metallic rods and a flexible mat that is removably attached to the plurality of metallic rods. The sleeping cot unit may further include a plurality of front brackets attached to the A-pillars, or adjacent members, of the vehicle and a plurality of rear brackets attached to the B-pillars, or adjacent members, of the vehicle. Further, one metallic rod is removably attached to the plurality of front brackets, and another metallic rod is removably attached to the plurality of the rear brackets. The sleeping cot unit may further include a plurality of straps for strapping the mat around the metallic rods. Each strap is attached to an end portion of the mat and is provided with a snap fastener. The sleeping cot unit may further include a plurality of pins that are used for locking the metallic rods with the brackets. Each pin is attached by means of a ring or a threaded ribbon. Further, each metallic rod is provided with at least one hole at its end that is used for locking it with a respective bracket. Further, each bracket includes a cylindrical portion for supporting the metallic rod. Further, each bracket is provided with a plurality of holes that are used for fastening it to the A-pillar, door, or B-pillar of the vehicle. Further, when installed, the mat may be made more firm with rotation and locking of a metallic rod within a respective bracket.

These and other features and advantages along with other embodiments of the present invention will become apparent from the detailed description below, in light of the accompanying drawings.

BRIEF DESCRIPTION OF DRAWINGS

The foregoing summary, as well as the following detailed description of the innovation, is better understood when read in conjunction with the appended drawings. For the purpose of illustrating the innovation, exemplary constructions of the innovation are shown in the drawings. However, the innovation is not limited to the specific methods and structures disclosed herein. The description of a method step or a structure referenced by a numeral in a drawing is applicable to the description of that method step or structure shown by that same numeral in any subsequent drawing herein.

Further areas of applicability of the present invention will become apparent from the detailed description provided hereinafter. It should be further understood that the detailed description of exemplary embodiments is intended for illustration purposes only and is, therefore, not intended to necessarily limit the scope of the invention.

DETAILED DESCRIPTION

As used in the specification and claims, the singular forms "a", "an", and "the" may also include plural references. For example, the term "an article" may include a plurality of articles. Those with ordinary skill in the art will appreciate that the elements in the figures are illustrated for simplicity and clarity and are not necessarily drawn to scale. For example, the dimensions of some of the elements in the figures may be exaggerated, relative to other elements, in order to improve the understanding of the present invention. There may be additional components described in the foregoing application that are not depicted on one of the described drawings. In the event such a component is described, but not depicted in a drawing, the absence of such a drawing should not be considered as an omission of such design from the specification.

Before describing the present invention in detail, it should be observed that the present invention utilizes a combination of components, which constitutes a sleeping cot unit that can be partially installed in vehicles (such as trucks and vans) and deployed when needed. Accordingly, the components have been represented, showing only specific details that are pertinent for an understanding of the present invention so as not to obscure the disclosure with details that will be readily apparent to those with ordinary skill in the art having the benefit of the description herein. As required, the detailed embodiments of the present invention are disclosed herein. However, it is to be understood that the disclosed embodiments are merely exemplary of the present invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the present invention.

References to "one embodiment", "an embodiment", "another embodiment", "yet another embodiment", "one example", "an example", "another example", "yet another example", and so on, indicate that the embodiment(s) or example(s) so described may include a particular feature, structure, characteristic, property, element, or limitation, but that not every embodiment or example necessarily includes that particular feature, structure, characteristic, property, element, or limitation. Furthermore, repeated use of the phrase "in an embodiment" does not necessarily refer to the same embodiment.

The words "comprising", "having", "containing", and "including", and other forms thereof, are intended to be equivalent in meaning and be open ended in that an item or items following any one of these words is not meant to be an exhaustive listing of such item or items or meant to be limited to only the listed item or items.

Unless stated otherwise, terms such as "first" and "second" are used to arbitrarily distinguish between the elements or entities. Thus, these terms are not necessarily intended to indicate temporal or other prioritization of such elements or priorities. While various exemplary embodiments of the disclosed apparatuses have been described below, it should be understood that they have been presented for purposes of example only, and not limitations. It is not exhaustive and does not limit the present invention to the precise form disclosed. Modifications and variations are possible in light of the below teachings or may be acquired from practicing of the present invention, without departing from the breadth or scope.

The Sleeping cot unit, along with its assembly and installation in a vehicle, of the present invention will now be described with reference to the accompanying drawings, which should be regarded as merely illustrative without restricting the scope and ambit of the present invention. Embodiments of the present invention will now be described with reference to FIGS. 1-12.

Figure 1A:
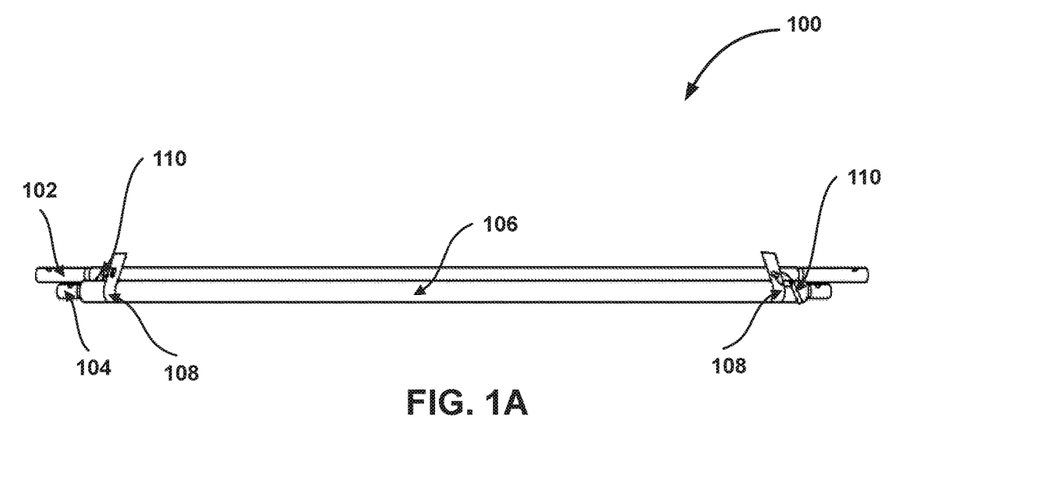
FIG. 1A exemplarily illustrates a folded view of a sleeping cot unit, according to an embodiment of the present invention.

FIG. 1A exemplarily illustrates a folded view of a sleeping cot unit 100, according to an embodiment of the present invention. The sleeping cot unit 100 may be installed by securing it to the vertical members in the front cabin of a vehicle such as vans or trucks. Various components of the sleeping cot 100 may include a plurality of metallic rods 102 and 104, a mat 106, a plurality of straps 108, a plurality of locking pins 110. As shown, the mat 106 is wrapped around the metallic rods 102 and 104 and is tied using the straps 108. In an exemplary embodiment, the rods 102 and 104 may be made of 0.120″ walled DOM iron steel. Further, for the mat 106, any suitable fabric with high durability may be used without limiting the scope of the present invention. Further, the cot fabric for the mat 106 is an open sleeve on one end and the bar or rod on this end may slide and rotate freely within this sleeve. It is folded over and sewn together. The other end of the mat is adhered to the bar or rod with a double-sided adhesive tape and the fabric is rolled around this bar or rod. In some embodiments, each strap 108 may include a locking button mechanism for fastening the strap around the fabric that is rolled around the bar or rod. Further, the locking pin 110 may be attached to the unit utilizing the strap 108 and/or through a ring or with a threaded ribbon. In an exemplary scenario, one metallic rod with a mat wrapped around it can be rotated within brackets to stretch the mat creating a firmer platform. The metallic rod may be secured in place within bracket to in turn secure the firmness of the mat, as described below in detail.

Figure 1B:
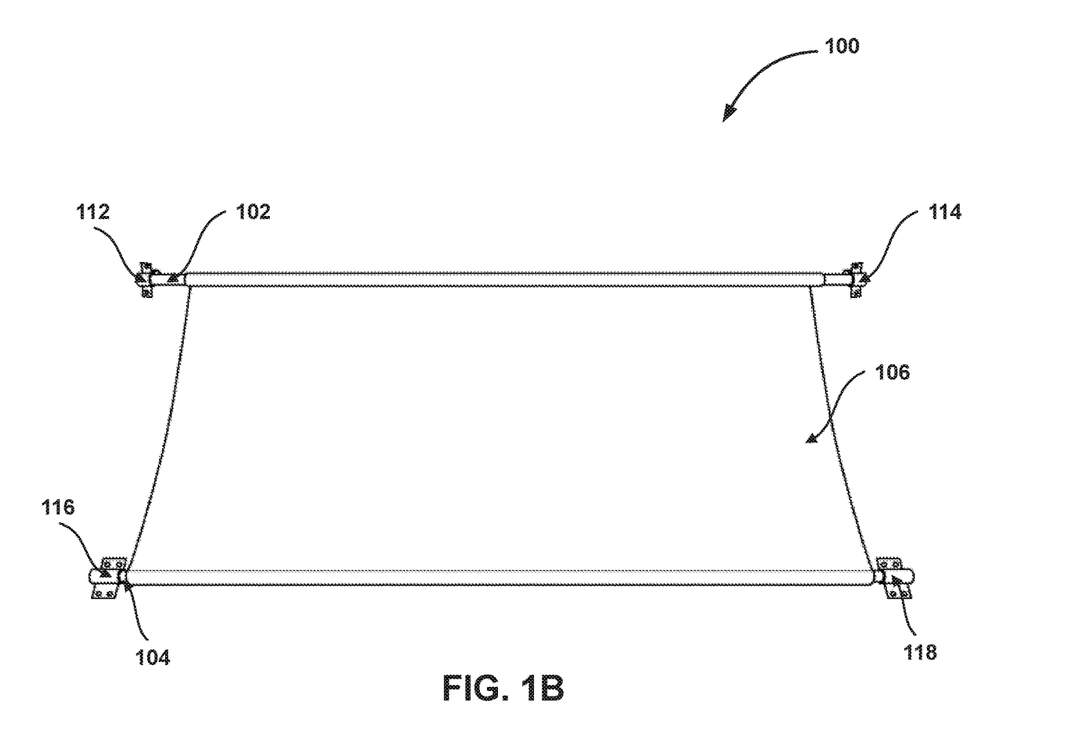
FIG. 1B exemplarily illustrates an unfolded view of the sleeping cot unit, according to an embodiment of the present invention.

FIG. 1B exemplarily illustrates an unfolded view of the sleeping cot unit 100, according to an embodiment of the present invention. As discussed above, the sleeping cot unit 100 may include the metallic rods 102 and 104, the mat 106, the straps 108, and the locking pins 110. In addition, the sleeping cot unit 100 may require the use of a plurality of brackets such as a front-and-left side door bracket 112, a front-and-right side door bracket 114, a rear-and-left side bracket 116, and a rear-and-right side bracket 118. The front-and-left side door bracket 112 is a bracket that is installed on a front door and is on the left side of a vehicle located at or near the A-pillar. In some jurisdictions or locations, the front-and-left side door bracket 112 may be referred to as a driver side door bracket. The front-and-right side door bracket 114 is a bracket that is installed on a front door and is on the right of the vehicle located at or near the A-pillar. In some jurisdictions or locations, the front-and-right side door bracket 112 may be referred to as a passenger side door bracket. The rear-and-left side bracket 116 is a bracket that is installed on the B-pillar and is on the left side of the vehicle. The rear-and-left side bracket 116 may be referred to as a driver side B-pillar bracket. The rear-and-right side bracket 118 is a bracket that is installed on the B-pillar and is on the right side of the vehicle. The rear-and-right side bracket 118 may be referred to as a passenger side B-pillar bracket. Each bracket is made of a metallic material having one hollow cylindrical portion and one or more flat portions. Each flat portion may be embedded with one or more holes that are used for fastening the bracket to a respective portion (such as the door, the A-pillar, or the B-pillar) of the vehicle. Further, the hollow cylindrical portion of each bracket may be used for inserting one end of the metallic rod and thereby supporting the hanging of the sleeping cot unit 100 in the vehicle.

Figure 2A:
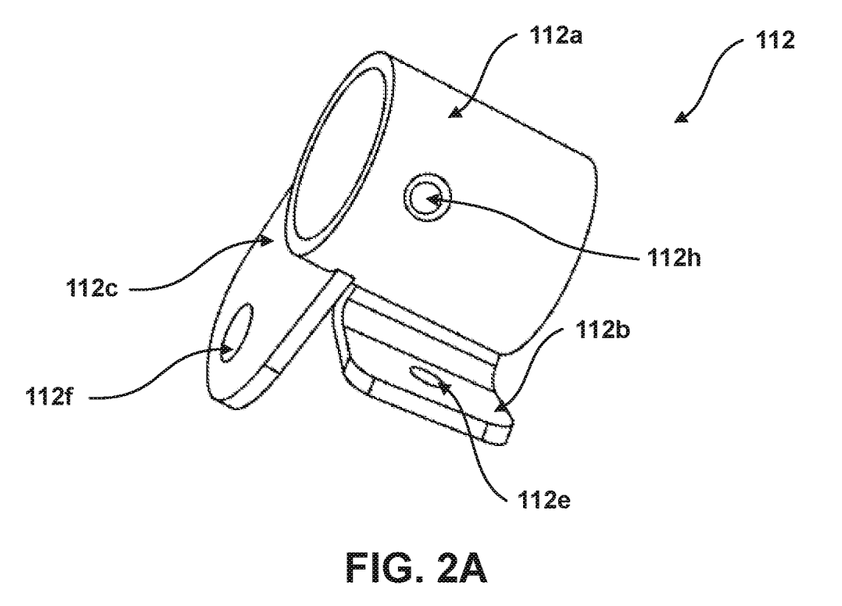
FIGS. 2A and 2B exemplarily illustrate different views of a front side door bracket, according to an embodiment of the present invention.
Figure 2B:
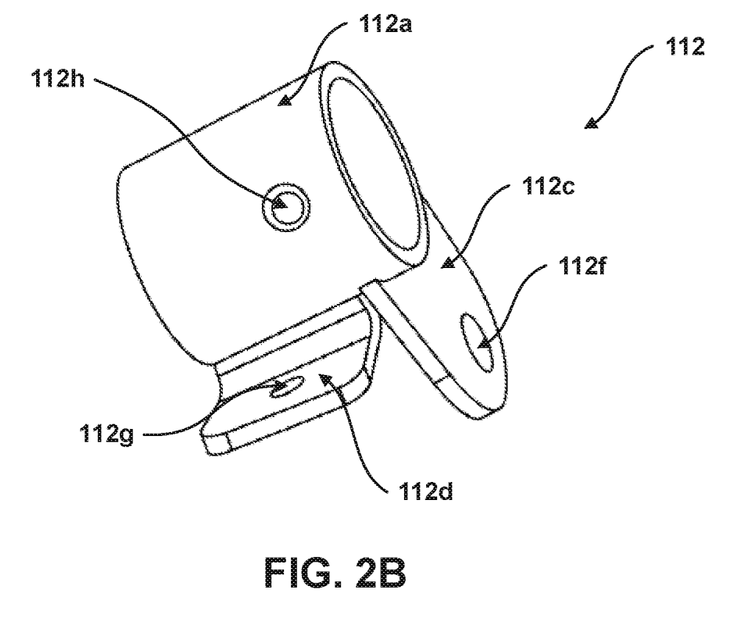
Figure 3A:
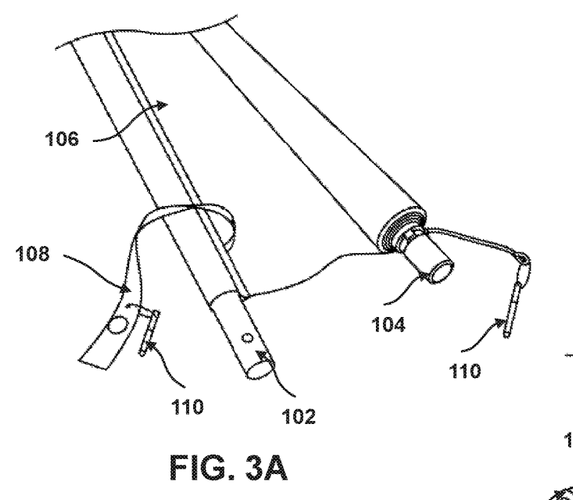
FIGS. 3A-3D exemplarily illustrate integral components of the sleeping cot unit, according to an embodiment of the present invention.
Figure 3B:
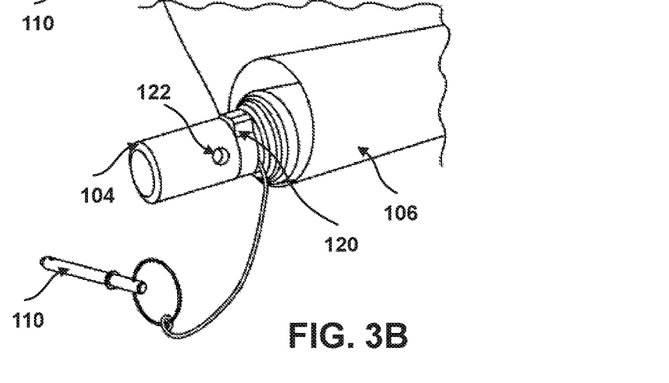
Figure 3C:
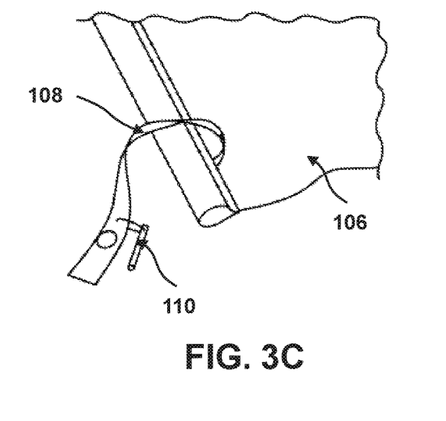
Figure 3D:
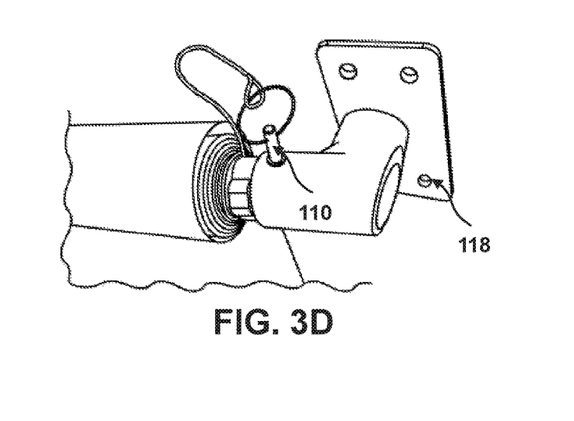

FIGS. 2A and 2B exemplarily illustrate different views of the front side door bracket 112 (or 114), according to an embodiment of the present invention. The door bracket 112 may be a metallic bracket and may include the cylindrical portion 112*a*. The cylindrical portion 112*a* includes a hole 112*h* that may be used for locking, for example, by using the locking pin 110 of FIG. 1A. Further, the hollow cylindrical portion of each bracket may be used for inserting one end of the metallic rod and thereby supporting the hanging of the sleeping cot 100 in the vehicle. Further, the door bracket 112 may include three flat portions as shown by 112*b*, 112*c*, and 112*d*. Each flat portion 112*b*, 112*c*, or 112*d* includes a hole 112*e*, 112*f*, or 112*g*, respectively, that is used for fastening the bracket to a respective portion (such as the door or the A-pillar) of the vehicle. Similar to the door bracket 112, another door bracket 114 may include the similar flat portions as shown by 112*b*, 112*c*, and 112*d* that are used for fastening the bracket to a respective portion (such as the door or the A-pillar) of the vehicle.

FIGS. 3A-3D exemplarily illustrate integral components of the sleeping cot unit 100, according to an embodiment of the present invention. As discussed above, the sleeping cot 100 may include the metallic rods 102 and 104, the mat 106, the straps 108, and the locking pins 110. The rods 102 and 104 may be made of 0.120" walled DOM iron steel. Further, for the mat 106, any suitable fabric with high durability may be used without limiting the scope of the present invention. In some embodiments, each strap 108 may include a locking button mechanism for fastening the strap around the fabric when fully rolled around the bar or rod. Further, the locking pin 110 may be attached to the strap 108 through a ring and/or a threaded ribbon. In addition, one rod such as the rod 104 of the sleeping cot unit 100 may include a bump 120. The bump 120 on the end of the bar or rod 104 may be used to twist the bar or rod by a user to tighten the mat 106 when the sleeping cot unit 100 is deployed. This bump 120 serves two purposes. Firstly, the bump 120 makes it possible to use a wrench on the cot bar or rod 104 for leverage to tighten the fabric 106, and secondly, the bump 120 stops the cot bar or rod 104 at the appropriate depth inside the B-pillar bracket 118 for the hole 122 to line up with a respective hole allowing the user to insert the pin 110 and accordingly lock its movement.

Figure 4A:
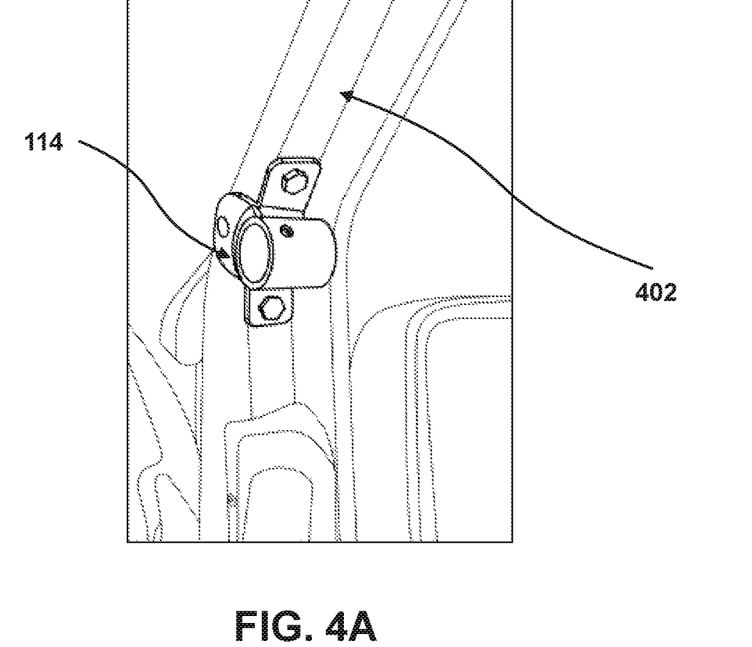
FIG. 4A exemplarily illustrates an installed view of a front-and-right side door bracket, according to an embodiment of the present invention.

FIG. 4A exemplarily illustrates an installed view of the front-and-right side door bracket 114, according to an embodiment of the present invention. As shown, the front-and-right side door bracket 114 is installed on an inner portion of the front door that is on the right of the vehicle and may be aligned with the A-pillar 402 of the vehicle. This bracket 114 may be tightened or fastened to the inner portion of the right-front door adjacent the A-pillar 402 by means of one or more screws as shown.

Figure 4B:
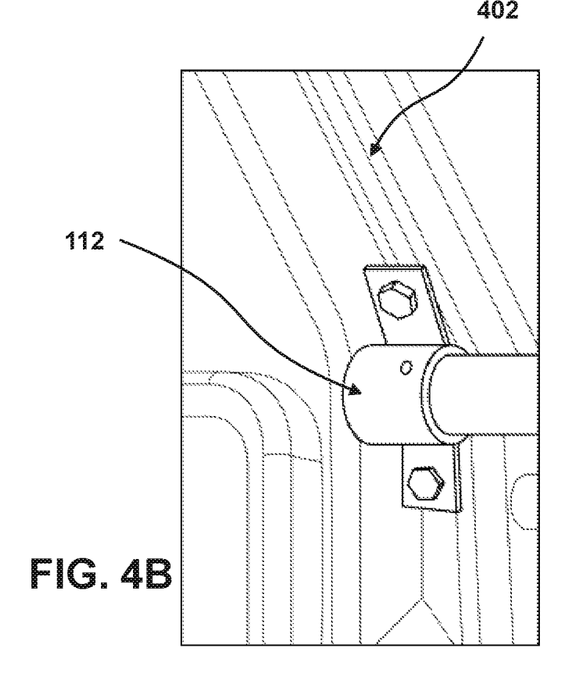
FIG. 4B exemplarily illustrates an installed view of a front-and-left side door bracket, according to an embodiment of the present invention.

FIG. 4B exemplarily illustrates an installed view of the front-and-left side door bracket 112, according to an embodiment of the present invention. As shown, the front-and-left side door bracket 112 is installed on an inner portion of the front door that is on the left of the vehicle and may be aligned with the A-pillar 402 of the vehicle. This bracket 112 may be tightened or fastened to the inner portion of the left-front door adjacent the A-pillar 402 by means of one or more screws as shown.

Figure 5A:
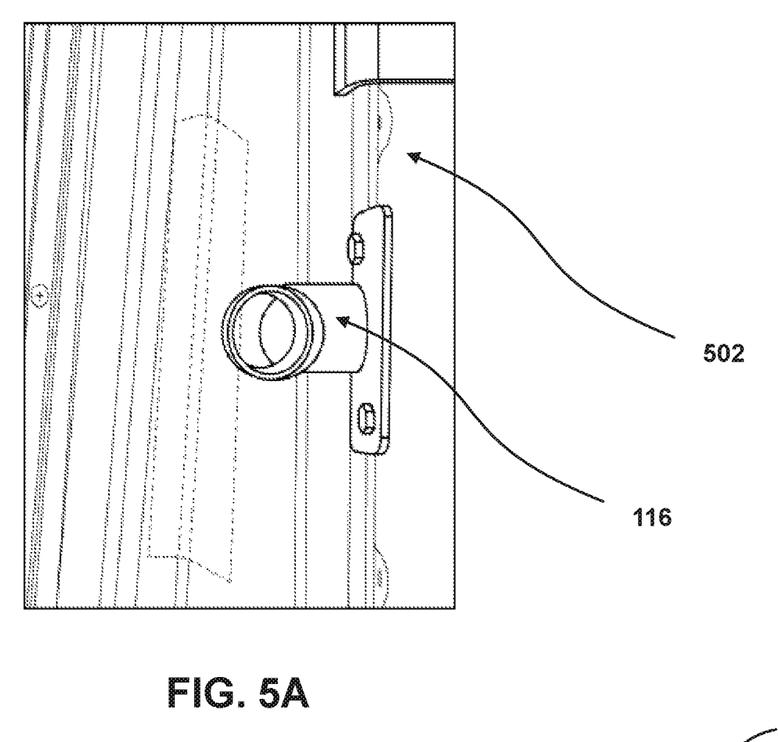
FIGS. 5A and 5B exemplarily illustrate an installed view of a rear-and-left side bracket, according to an embodiment of the present invention.
Figure 5B:
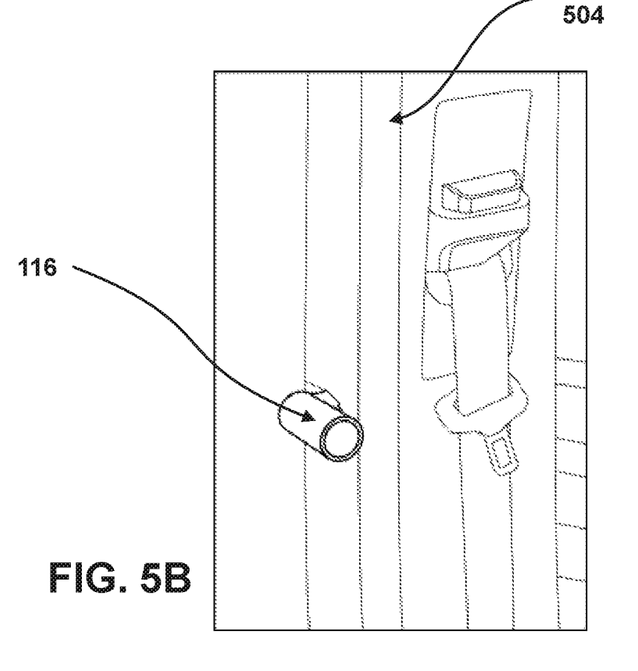

FIGS. 5A and 5B exemplarily illustrate an installed view of the rear-and-left side bracket 116, according to an embodiment of the present invention. The rear-and-left side bracket 116 is installed on the B-pillar 502 of the vehicle and is on the left side of the vehicle. This bracket 116 may be tightened or fastened to the inner portion of the B-pillar 502, as shown, by means of one or more screws. In FIG. 5A, the B-pillar 502 has been shown without its plastic covering. Thus, the bracket 116 is actually attached to the metallic portion of the B-pillar 502. Thereafter, the B-pillar 502 is covered with its plastic covering 504 as shown in FIG. 5B. In such a situation, only the cylindrical portion of this bracket 116 is visible from outside.

Figure 6A:
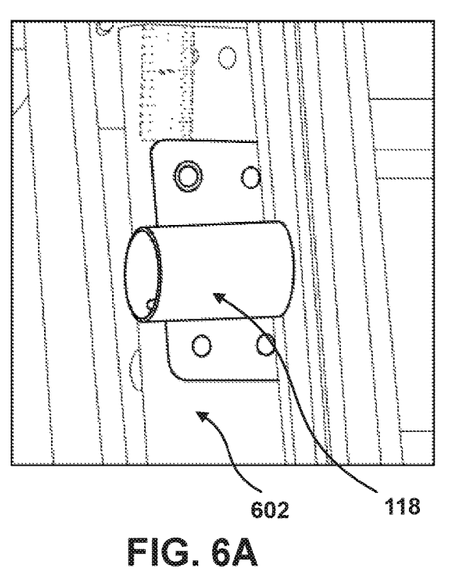
FIGS. 6A-6C exemplarily illustrate an installed view of a rear-and-right side bracket, according to an embodiment of the present invention.
Figure 6B:
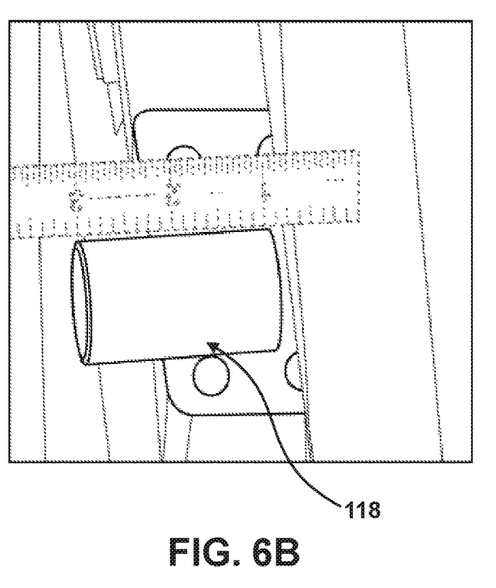
Figure 6C:
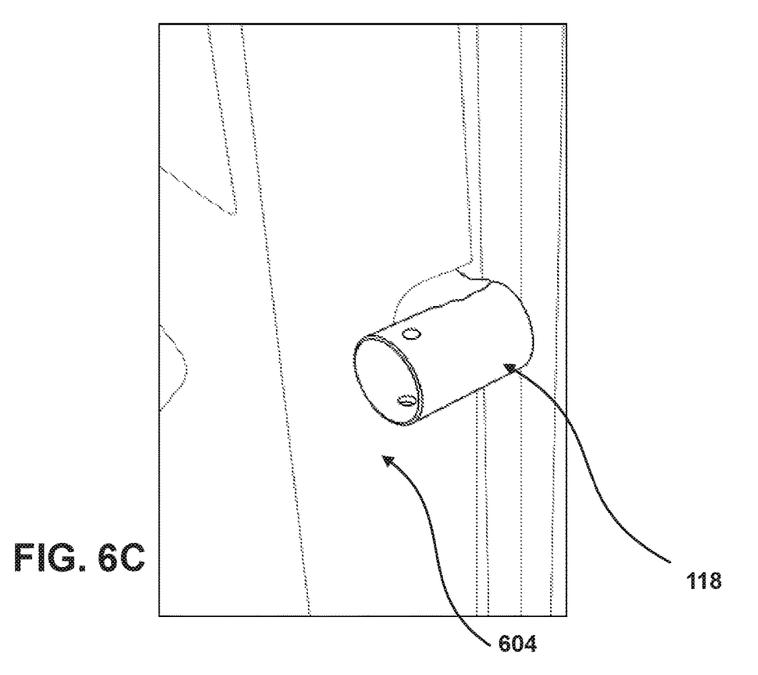

FIGS. 6A-6C exemplarily illustrate an installed view of a rear-and-right side bracket 118, according to an embodiment of the present invention. The rear-and-right side bracket 118 is installed on the B-pillar 602 of the vehicle and is on the right side of the vehicle. This bracket 118 may be tightened or fastened to the inner portion of the B-pillar 602, as shown, by means of one or more screws. In FIG. 6A, the B-pillar 602 has been shown without its plastic covering. Thus, the bracket 118 is actually attached to the metallic portion of the B-pillar 602. Thereafter, the B-pillar 602 is covered with its plastic covering 604 as shown in FIG. 6C. In such a situation, only the cylindrical portion of this bracket 118 is visible from outside.

Figure 7A:
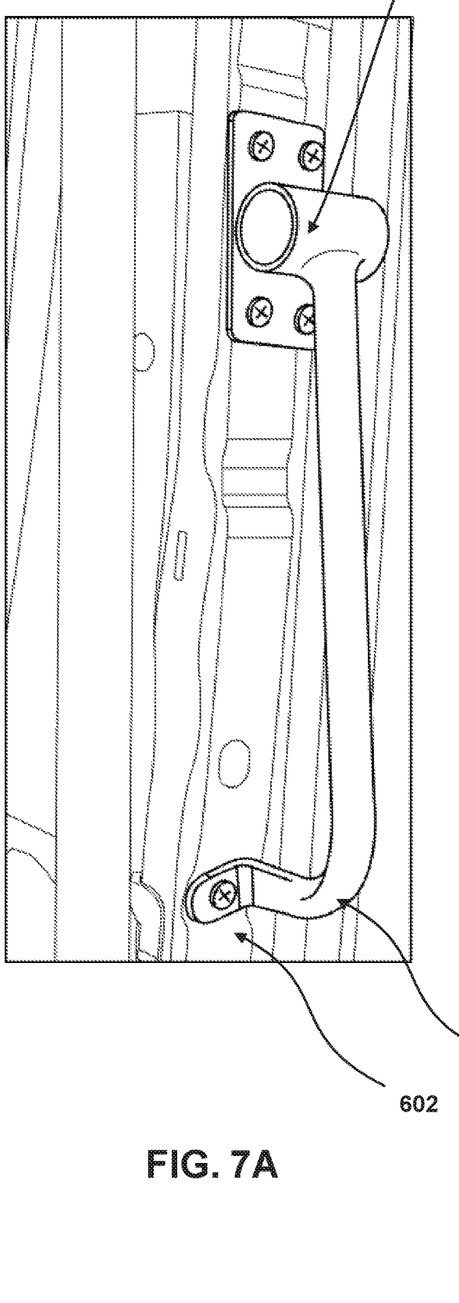
FIGS. 7A and 7B exemplarily illustrate an installed view of a rear-and-right side bracket, according to another embodiment of the present invention.
Figure 7B:
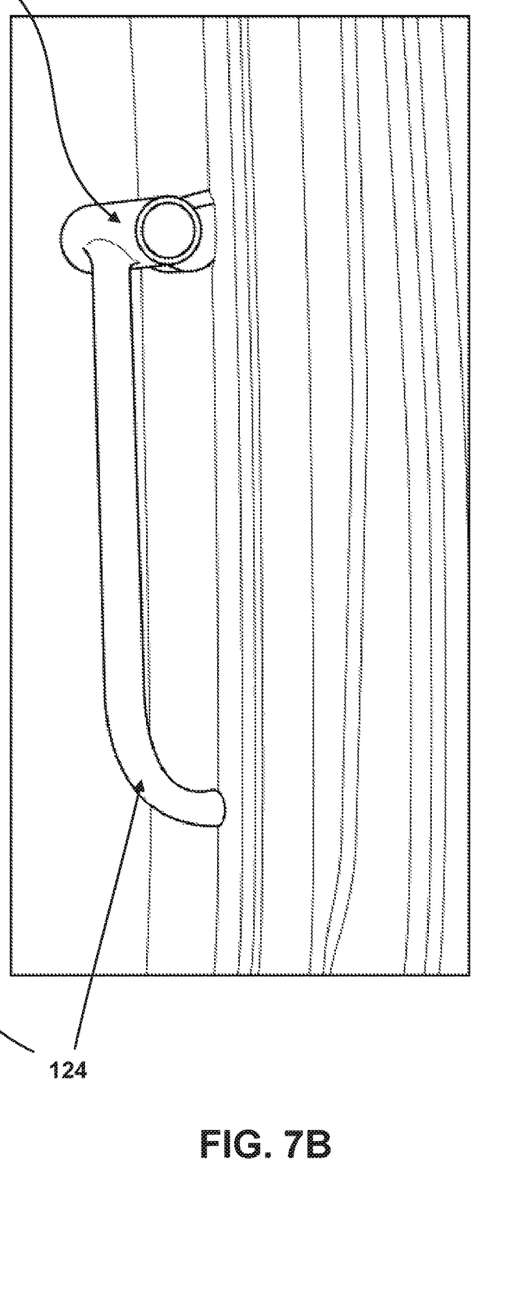
Figure 8:
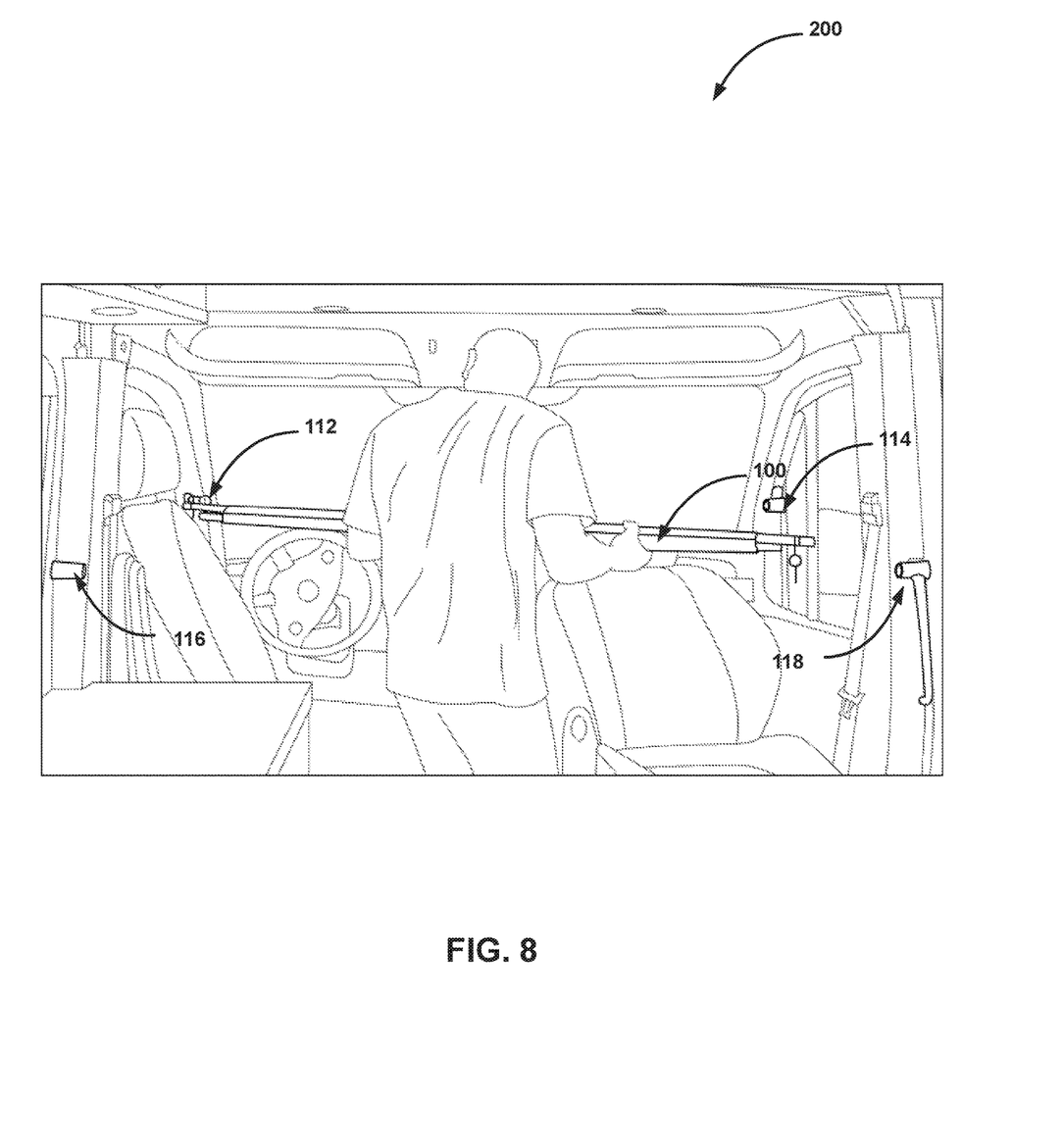
FIGS. 8-11 exemplarily illustrates an installation process for installing the sleeping cot unit in a vehicle, according to an embodiment of the present invention.
Figure 9:
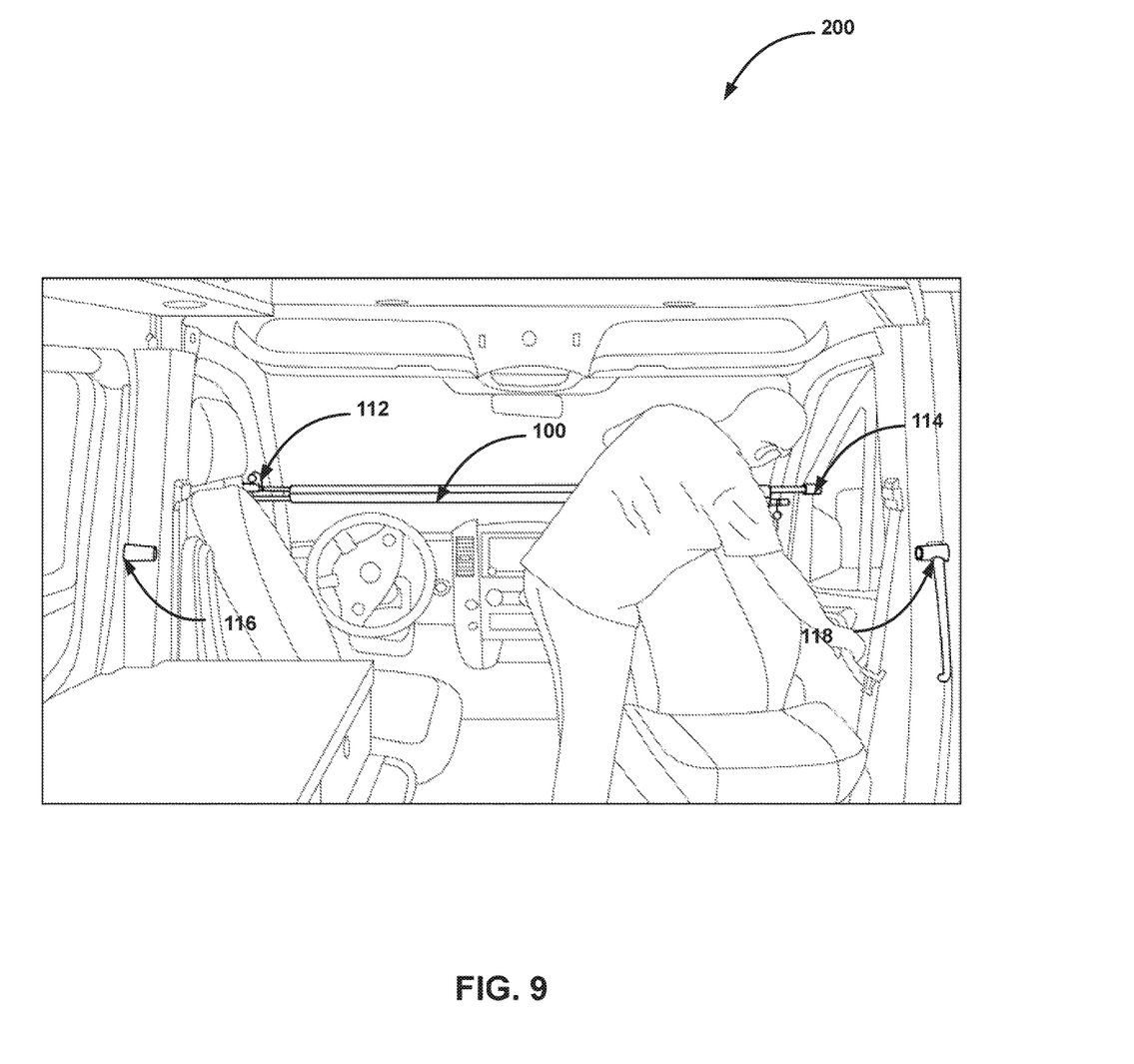
Figure 10:
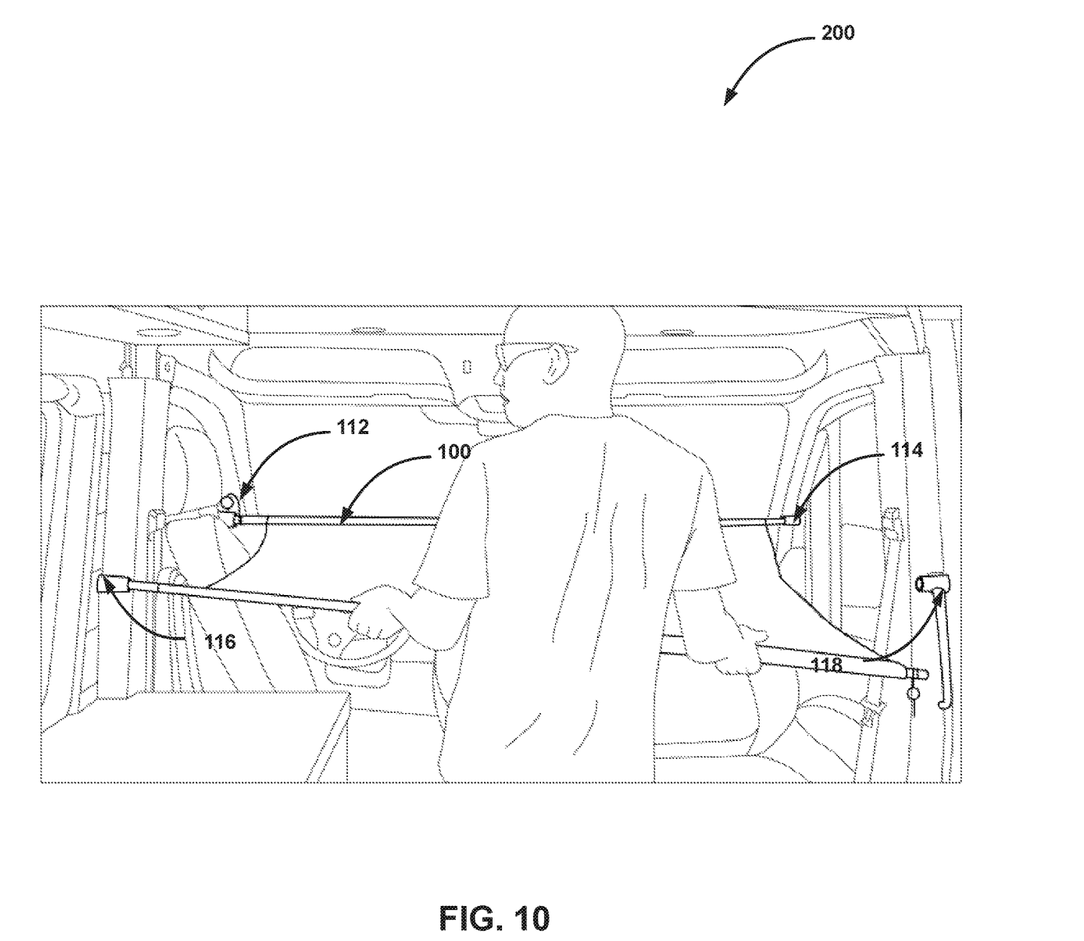
Figure 11:
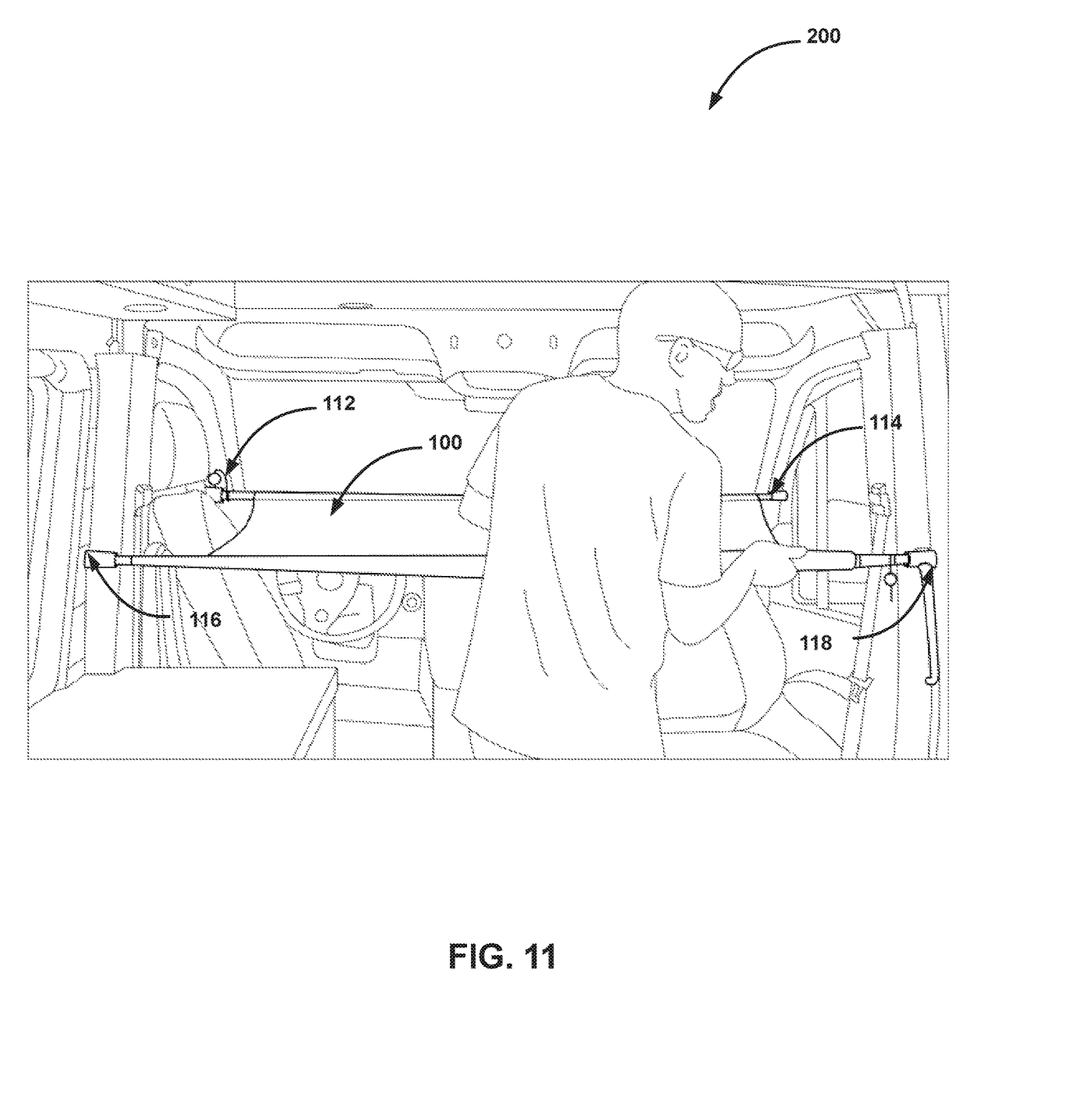

FIGS. 7A and 7B exemplarily illustrate an installed view of the rear-and-right side bracket 118, according to another embodiment of the present invention. In this embodiment, the bracket 118 may be provided with an attached handlebar 124 that is made of the same material as the bracket 118. This bracket 118 with the handlebar 124 may be installed on the B-pillar 602 of the vehicle that is on the right side of the vehicle. This bracket 118 may be tightened or fastened to the inner portion of the B-pillar 602, as shown, by means of one or more screws.

FIGS. 8-11 exemplarily illustrate an installation process for deploying the sleeping cot unit 100 in the vehicle, according to an embodiment of the present invention. As shown, the sleeping cot 100 includes the metallic rods 102 and 104 and the mat 106 and other components not specifically shown here but have been described above without limiting the scope of the present invention. The brackets (as shown by 112, 114, 116, and 118) have been already installed into the doors adjacent the A-pillar and into the portions of the B-pillar of the vehicle. Such installation process has been described below as an exemplary process and should not be construed as limiting to the scope of the present invention.

The installation steps may include:
1. Remove grey plastic covers on both B-pillars.
2. Temporary locate B-pillar brackets.
   a. Position the top edge of the passenger side bracket 1¼" below the factory stamped holes. Be sure the entire outside edge of the bracket is pressed up against the metal pinch weld. Drill holes to locate fastener locations.
   b. Repeat step "a" for the driver-side B-pillar bracket
3. Install rivet nut fasteners and secure B-pillar brackets with bolts such as ¼-20 bolts using loc-tite if desired.
4. Cut holes in plastic B-pillar covers and re-install.
5. Install door brackets
   a. Mark a line 1¼" up from the highest point of the grey plastic a handle.
   b. Position the door bracket into place with the bottom edge of the bracket on the line and the outside edge pressed against the black rubber. Be sure you have the correct bracket with the small hole in the tube facing upward.
   c. Install rivet nut fasters.
   d. Install bracket with bolts such as ¼-20 bolts using loc-tite if desired.

After installing the brackets at the appropriate places of the door or A-pillar and B-pillar (as shown in FIGS. 8-11), the user may deploy the sleeping cot portion 100. As shown, one end of the mat 106 is fitted with or wrapped around one rod 102 and another end of the mat 106 is fitted with or wrapped around another rod 104. Thereafter, the user may insert one end of the rod 102 into the bracket 112 and another end of the rod 102 into the bracket 114. The user may slightly open the front doors of the vehicle to appropriately fit both ends of the rod 102 into the brackets 112 and 114. Thereafter, the user may insert one end of the rod 104 into the bracket 116 and another end of the rod 104 into the bracket 118. In order to do so, the user may appropriately adjust the driver and passenger seats of the vehicle. After inserting the rods into the brackets, the user may tighten the mat 106 by rotating the bump 120 provided on the rod 104 by using a wrench or other means. Once the fabric is stretched to the desired firmness, the rotation and position of the rod 104 may be locked in place by inserting the pin 110 through aligned holes of the bracket 118 and the rod 104. Thereafter, the installed sleeping cot 100 may be mounted by a child or small adult. One such use case has been shown in FIG. 12.

Figure 12:
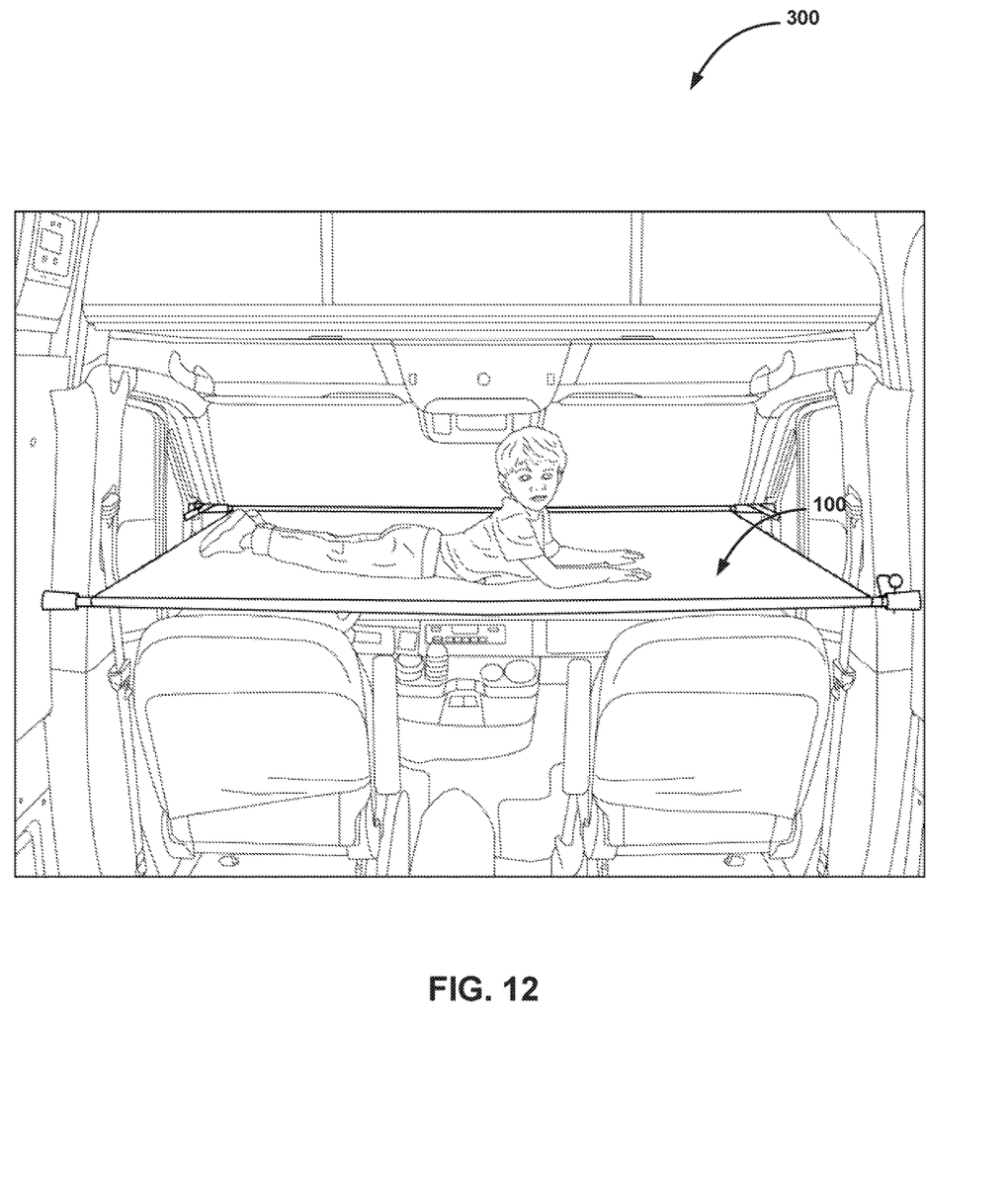
FIG. 12 exemplarily illustrates a use case scenario for using the sleeping cot unit in the vehicle, according to an embodiment of the present invention.

FIG. 12 exemplarily illustrates a use case scenario 300 for using the sleeping cot unit 100 in the vehicle, according to an embodiment of the present invention. As shown, the sleeping cot 100 has been installed inside the vehicle and a child is resting on top of the sleeping cot 100.

Although particular embodiments of the invention have been described in detail for purposes of illustration, various modifications and enhancements may be made without departing from the spirit and scope of the invention.

What is claimed is:

1. A sleeping cot, comprising of:
   a plurality of metallic rods, each of the metallic rods having a first end and a second end,
   a mat that is removably attached to the plurality of metallic rods,
   a plurality of front brackets attached to or adjacent to A-pillars of a vehicle, and
   a plurality of rear brackets attached to or adjacent to B-pillars of the vehicle, wherein,
      one of the metallic rods is removably attached to the plurality of front brackets, and
      another of the metallic rods is removably attached to the plurality of rear brackets, and
      each of the metallic rods is provided with at least one hole at one of the first end and the second end that is used for locking with a respective one of the front brackets or the rear brackets by using a locking pin.

2. The sleeping cot unit of claim 1, further comprising a plurality of straps for strapping the mat around the metallic rods when folded for storage.

3. The sleeping cot unit of claim 2, wherein each of the straps is attached to an end portion of the mat and each of the straps is provided with a fastener.

4. The sleeping cot unit of claim 1, wherein each of the pins is attached by using a ring.

5. The sleeping cot unit of claim 1, wherein each of the brackets includes a cylindrical portion for supporting a respective one of the metallic rods.

6. The sleeping cot unit of claim 1, wherein each of the brackets is provided with a plurality of holes that are used for fastening a respective one of the brackets to a door, one of the A-pillars, or one of the B-pillars of the vehicle.

7. The sleeping cot unit of claim 1, wherein one of the rear brackets is provided with a handle.

8. The sleeping cot unit of claim 1, wherein each of the metallic rods is made of 0.120" iron.

9. The sleeping cot unit of claim 1, wherein one of the first end or the second end of the metallic rod that inserts into the bracket of the B-pillar includes a bump.

10. The sleeping cot unit of claim 9, wherein the bump is used to stop the metallic rod at a depth inside the respective bracket for two holes to line up so that a user can drop a pin through the two holes and accordingly lock the rod's movement.

11. The sleeping cot unit of claim 1, wherein one of the metallic rods with the mat wrapped around it can be rotated within the respective brackets to stretch the mat creating a firmer platform.

12. The sleeping cot of claim 11, wherein the metallic rod with the mat wrapped around it can be secured in place within the respective bracket to in turn secure the firmness of the mat.

13. A sleeping cot unit, comprising of:
   a plurality of metallic rods, each of the rods having a first end and a second end,
   a mat that is removably attached to the plurality of metallic rods,
   a plurality of front brackets attached to or adjacent to A-pillars of a vehicle, and
   a plurality of rear brackets attached to or adjacent to B-pillars of the vehicle, wherein,
      one of the metallic rods is removably attached to the plurality of front brackets,
      another of the metallic rods is removably attached to the plurality of rear brackets,
      one of the first end or the second end of the metallic rod that inserts into a respective one of the brackets of the B-pillar includes a bump, and
      the bump is used to stop the respective metallic rod at a depth inside the respective bracket for two holes to line up so that a user can drop a pin through and accordingly lock the rod's movement.

14. The sleeping cot unit of claim 13, further comprising a plurality of straps for strapping the mat around the metallic rods when folded for storage, wherein each of the straps is attached to an end portion of the mat and each of the straps is provided with a fastener.

15. The sleeping cot unit of claim 13, wherein each of the pins is attached by using a ring.

16. A sleeping cot unit, comprising of:
a plurality of metallic rods, each of the rods having a first end and a second end,
a mat that is removably attached to the plurality of metallic rods,
a plurality of front brackets attached to or adjacent to A-pillars of a vehicle, and
a plurality of rear brackets attached to or adjacent to B-pillars of the vehicle, wherein,
one of the metallic rods is removably attached to the plurality of front brackets,
another of the metallic rods is removably attached to the plurality of rear brackets,
each of the metallic rods is provided with at least one hole at the respective first end or the respective second end that is used for locking with a respective one of the brackets by using a locking pin,
one of the ends of the metallic rod that inserts into a respective one of the brackets of a respective one of the B-pillar includes a bump, and
the bump is used to stop the respective metallic rod at a depth inside the respective bracket for two holes to line up so that a user can drop a pin through the two holes and accordingly lock the rod's movement.

17. The sleeping cot unit of claim 16, wherein one metallic rod with the mat wrapped around it can be rotated within the respective brackets to stretch the mat creating a firmer platform.

18. The sleeping cot of claim 17, wherein the respective metallic rod can be secured in place within the respective brackets to in turn secure the firmness of the mat.

* * * * *